United States Patent [19]

Heep et al.

[11] Patent Number: 5,014,885
[45] Date of Patent: May 14, 1991

[54] APPARATUS FOR FEEDING BULK MATERIAL

[75] Inventors: Dieter Heep, Bergatreute; Paul Vogel, Weingarten; Manfred Frey, Aulendorf-Zollenreute; Joachim Schmalz, Ravensburg, all of Fed. Rep. of Germany

[73] Assignee: Waeschle Maschinenfabrik GmbH, Ravensburg, Fed. Rep. of Germany

[21] Appl. No.: 280,634

[22] Filed: Dec. 6, 1988

[30] Foreign Application Priority Data

Dec. 15, 1987 [DE] Fed. Rep. of Germany ....... 3742519

[51] Int. Cl.$^5$ .............................................. G01F 11/10
[52] U.S. Cl. ................................................... 222/368
[58] Field of Search ................ 222/333, 334, 350, 368; 277/81 P; 414/219

[56] References Cited

U.S. PATENT DOCUMENTS

| 3,521,794 | 7/1970 | Bijl | 222/333 X |
| 3,556,355 | 1/1971 | Ruiz | 222/368 |
| 3,906,850 | 9/1975 | Papai | 222/565 X |
| 4,142,868 | 3/1979 | Gencsoy et al. | 414/219 X |
| 4,235,354 | 11/1980 | Anuma et al. | 222/368 |
| 4,784,298 | 11/1988 | Heep et al. | 222/368 X |

Primary Examiner—Michael S. Huppert
Assistant Examiner—Gregory L. Huson
Attorney, Agent, or Firm—Henry M. Feiereisen

[57] ABSTRACT

An apparatus for feeding bulk material includes a rotor with a plurality of radially extending vanes which are supported on a hollow shaft and are provided with sealing strips at their end faces. Shiftable within the shaft is an adjusting bar with at least two axially spaced conical surfaces which cooperate with push rods having one end bearing against the conical surfaces and another end in force-locking connection with the sealing strips. The adjusting bar is acted upon by a force-applying unit which subjects the adjusting bar to a constant axial holding force which is independent of the axial displacement of the adjusting bar so that a sufficient contact pressure is continuously maintained by which the sealing strips are urged against the housing.

11 Claims, 6 Drawing Sheets

APPARATUS FOR FEEDING BULK MATERIAL

BACKGROUND OF THE INVENTION

The present invention refers to an apparatus for feeding bulk material, in particular to a rotary feeder of the type including a housing provided with a top inlet and a bottom outlet and accommodating a cellular rotor which includes a plurality of radial vanes supported on a horizontal shaft and including sealing strips which extend parallel to the shaft and bear against the inner wall surface of the housing.

Such a rotary feeder is known from U.S. Pat. No. 4,784,298. In order to provide sufficient pressure of the sealing strips against the inner wall surface of the housing, the hollow shaft accommodates an adjusting bar which is shiftable in axial direction of the shaft to exert a radial force onto the sealing strips and is provided with at least two axially spaced conical surfaces which cooperate with push rods having one end bearing against the conical surfaces and another end in force-locking connection with the sealing strips. The adjusting bar is connected in force-locking manner with a displacement unit by which the adjusting bar is axially shifted thereby moving the sealing strips in radial direction. In this manner wear of the sealing strips can be compensated. The displacement unit includes a compression spring arranged in the hollow shaft and set at a prestress which is controllable from outside by an adjusting screw. The force exerted by such a compression spring decreases, however, in proportion to the readjustment and thus approximately with increasing wear of the sealing strips. Likewise, the force by which the sealing strips are pressed against the inner wall surface of the housing decreases. Since for reasons of long life of the sealing strips e.g. of more than one year, the initially set adjusting force is of a magnitude which should not exceed the force required to attain the desired sealing action especially against air leakage, the gradual decrease of the adjusting force eventually results in a gradual deterioration of the seal between the inner wall surface of the housing and the sealing strips of the rotor. This drawback can only be overcome by manual readjustment of the prestress of the pressure spring to the initial setting at regular e.g. monthly intervals.

SUMMARY OF THE INVENTION

It is an object of the present invention to provide an improved rotary feeder obviating the afore-stated drawbacks.

This object and others which will become apparent hereinafter are attained in accordance with the present invention by providing a force-applying unit acting upon the adjusting bar to subject the latter to a constant axial force which is independent of the axial displacement of the adjusting bar so as to continuously maintain a sufficient contact pressure of the sealing strips against the housing.

The present invention is based on the common principle of providing a force-applying unit which generates and subjects the adjusting bar to a constant, axially directed holding force which is independent of the axial displacement of the adjusting bar. The magnitude of this holding force is set only once to the optimum value at the time when the rotary feeder comes from the production line. Like the displacement force as disclosed in the U.S. Pat. No. 4,784,298, the holding force should be sufficiently high to ensure sufficient contact pressure of the sealing strips against the housing even after extended operation of the rotary feeder and upon increase of frictional forces especially due to dust between the sealing strips and their receptacle in the vanes.

Since the magnitude of the frictional forces which oppose the holding force cannot precisely be determined initially, the setting of the holding force should be increased by a certain safety factor so that the contact pressure exerted on the sealing strips is higher during the starting phase of the rotary feeder than actually required for the desired sealing action, thus subjecting the sealing strips initially to increased wear.

This initially increased wear may, however, be avoided when, in accordance with a further feature of the present invention, the adjusting bar is subjected at regular intervals to a temporary displacement force which is considerably higher than the constant holding force by which said sealing means is urged against said housing and which corresponds to the predetermined contact pressure. By subjecting the sealing strips periodically to such a displacement force, the holding force can be maintained at a lower level i.e. at a level which corresponds to the optimum contact pressure.

According to one embodiment of the present invention, the force-applying unit may include a lever assembly arranged outside of the housing of the rotary feeder and having one free end loaded by a weight member and another end hinged to the adjusting bar via suitable intermediate links. The weight member is supported by and moves along a long lever arm of the lever assembly in order to allow setting of the constant force. Pivoted to the long lever arm is a short lever arm which in turn is hinged to the adjusting bar via the intermediate links.

According to another embodiment of the present invention, the force-applying unit may also be an electric solenoid, with an armature operatively connected to the adjusting bar to subject the latter to the constant holding force.

The force-applying unit may, however, also be a pressure fluid actuated piston/cylinder arrangement, with a piston acting upon said adjusting bar and a working cylinder actuated by the pressure fluid which is supplied by a pressure source.

The displacement force may be considerably higher than the holding force to ensure that all static frictional forces prevailing during transmission of forces up to the sealing strips are overcome. Since the displacement force is applied only momentarily, the increased contact pressure at low frictional forces will not lead to increased wear.

Advantageously, the dividing of forces during readjustment of the sealing strips into a constant holding force and a momentary displacement force can be obtained by connecting the output of a pneumatically controlled OR-gate to the working cylinder of the piston/cylinder arrangement, with one of the two inputs of the OR-gate communicating with a first pressure regulator for supplying the constant holding force, and the other input being operatively connected to a solenoid valve for providing momentarily the displacement force.

BRIEF DESCRIPTION OF THE DRAWING

The above and other objects, features and advantages of the present invention will now be described in more detail with reference to the accompanying drawing in which.

DESCRIPTION OF PREFERRED EMBODIMENTS

Figure 1:
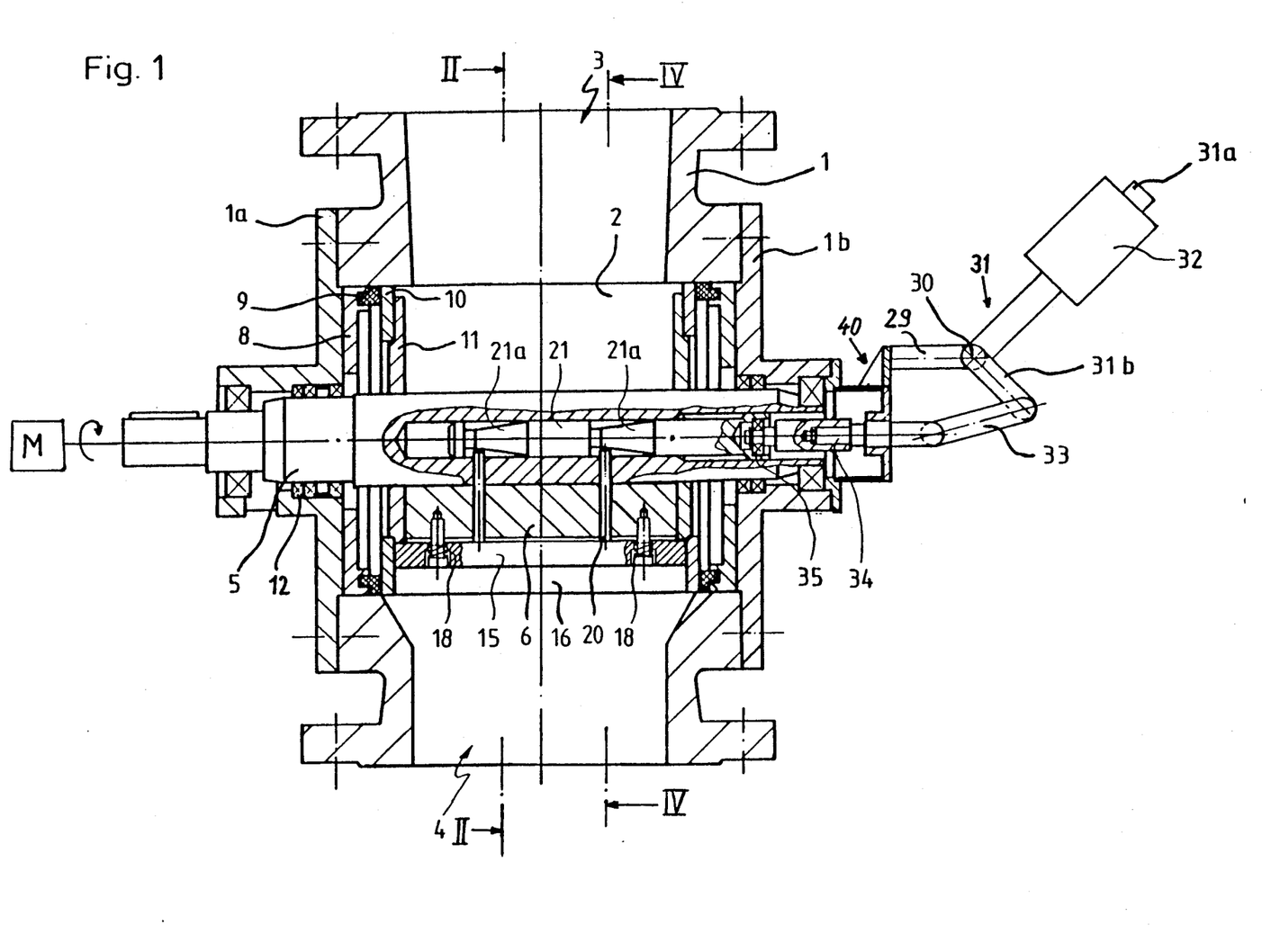
FIG. 1 is a longitudinal section of a first embodiment of a rotary feeder for bulk material in accordance with the invention.
Figure 2:
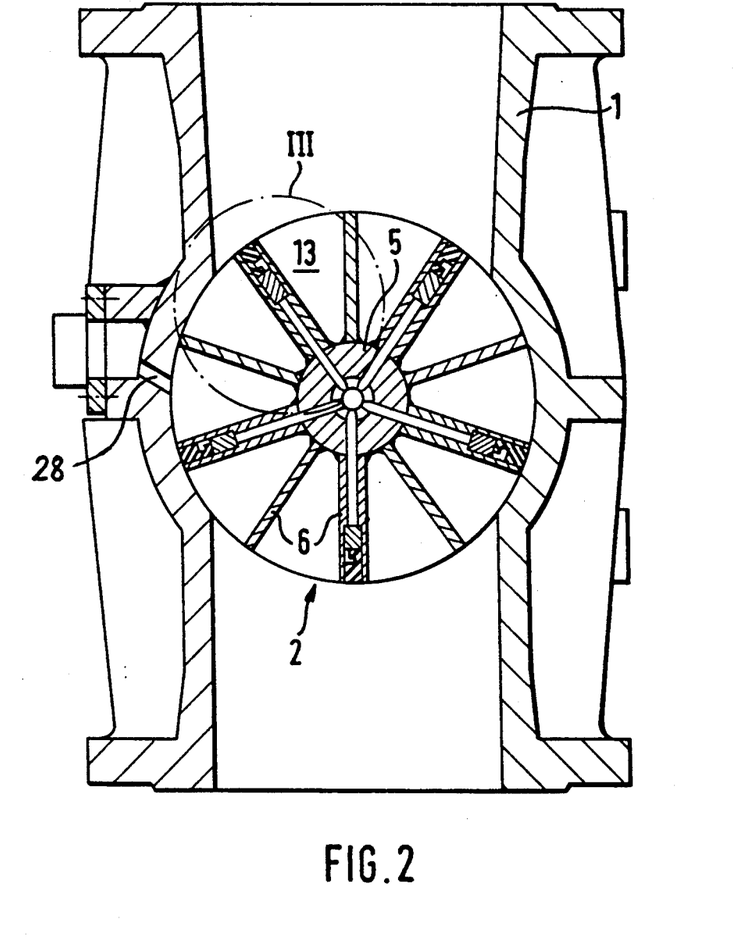
FIG. 2 is a cross sectional view of the rotary feeder taken along the line II—II in FIG. 1.

Referring now to the drawing, and in particular to FIGS. 1 and 2, there is shown one embodiment of an apparatus for feeding bulk material in form of a rotary feeder which corresponds in its basic structure to U.S. Pat. No. 4,784,298. The rotary feeder includes a housing 1 having an inlet port 3 and an outlet port 4 as well as a discharge port 28 provided for leakage air and suitably arranged before the inlet port 3 in rotational direction of the rotor 2. A cellular rotor 2 is mounted within the housing 1 on a shaft 5 which is rotatably journaled in suitable bearings 12 in respective side covers 1a, 1b on opposite sides of the housing 1 and is driven by a suitable motor M shown only schematically.

The rotor 2 is sealed in the housing 1 at both axial ends by a pressure plate 8 which is arranged at the inner surface of the pertaining side covers 1a, 1b and retains a sealing ring 9 along its periphery. The sealing ring 9 bears against the outer surface of thrust collars 10 which are threadably engaged with lateral disks 11 connected to the shaft 5 of the rotary feeder in non-rotational manner.

The rotor 2 includes a plurality of vanes 6 extending radially from the shaft 5 to define compartments 13 therebetween for transporting material from the inlet port 3 to the outlet port 4. The vanes 6 are preferably metallic plates with a radial length sufficiently dimensioned so that a narrow gap (not shown in the drawing) is defined between the radial end face of the vanes 6 and the inner wall surface of the housing 1.

Figure 3:
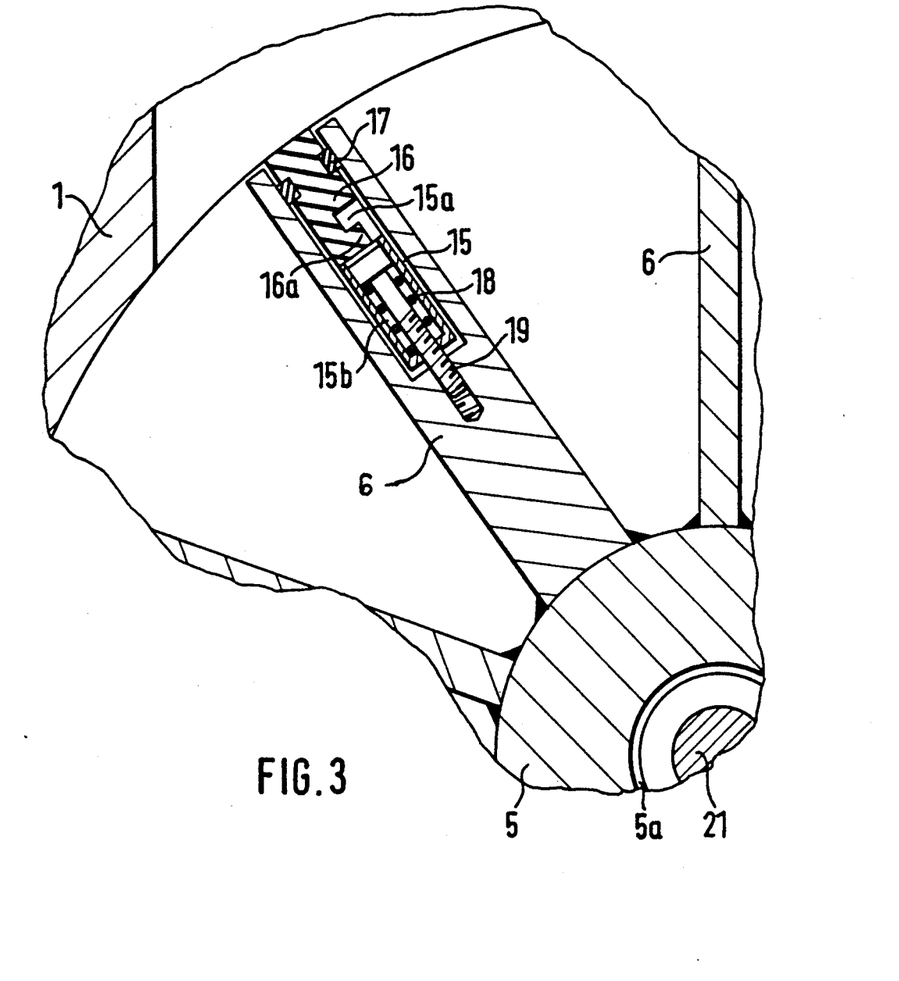
FIG. 3 is a partial cross sectional view on an enlarged scale according to section III in FIG. 2.
Figure 4:
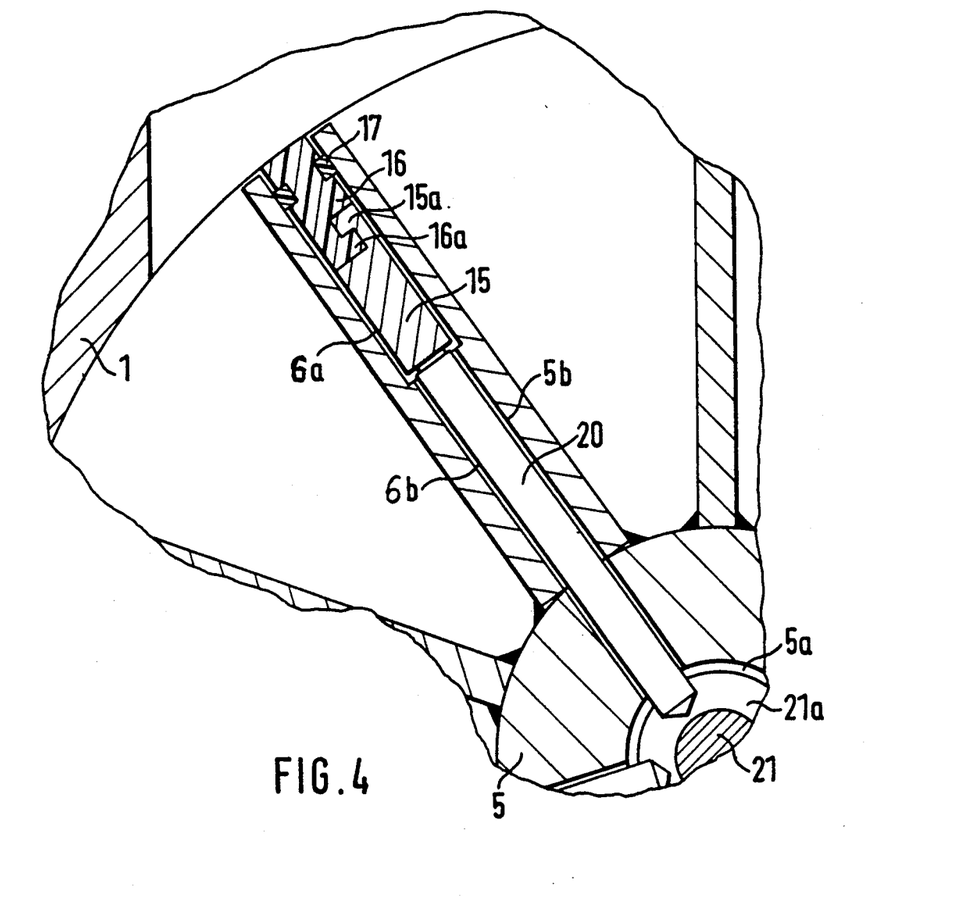
FIG. 4 is a partial cross sectional view on an enlarged scale similar to FIG. 3 and taken along the line IV—IV in FIG.1.

Each vane 6 or as shown in FIG. 2 every second vane 6 is provided with a seal which is illustrated in particular in FIGS. 3 and 4 in connection with one such vane 6. The vane 6 of the rotor 2 is provided with a groove 6a which extends in axial direction of the vane 6 and is open at its axial end facing the inner surface of the housing 1. At its other axial end, the groove 6a extends into a bore 6b of narrower cross section the purpose of which will be described furtherbelow.

Accommodated in the groove 6a is a support 15 which is provided with a flange 15a of inverted L-shape at its axial end facing the inner surface of the housing 1, and a sealing strip or sealing bar 16 which is provided at its axial end facing the support 15 with a flange 16a of L-shape which is in engagement with the flange 15a. Thus, the support 15 and the sealing strip 16 are interlocked with each other in form-fitting manner via a claw-like connection.

The sealing strip 16 is preferably made of a heat resistant self-lubricating plastic material such as e.g. polythetrafluoroethylene (PTFE). In order to prevent a penetration from dusty bulk material, the sealing strip 16 is sealed within the groove 6a by a circumferential O-ring 16.

Suitably, the sealing strip 16 is loaded in radial direction toward the shaft 5 by a suitable spring unit which prevents the sealing strip 16 from becoming disengaged from the vanes 6. Accordingly, as shown in FIG. 3, the support 15 includes several boreholes 15b in which a coil or compression spring 18 is arranged. The spring 18 is prestressed between the base of the support 15 and the head of a bolt 19 which traverses the support 15 and is threadably engaged into the pertaining vane 6. During rotation of the rotor 2 and advance of the sealing strips 16 past the inlet port 3 and outlet port 4, the springs 18 will retain the sealing strips 16 in place and prevent disengagement thereof.

As shown in FIG. 4 which illustrates a cross sectional of a vane 6, the support 15 is prevented from bearing against the base of groove 6a by two suitably spaced push rods 20. Each of the push rods 20 traverses the bore 6b of the vane 6 and an aligned bore 5b in the shaft 5 and projects into an axially extending central bore 5a of the shaft 5. With their other outer end remote to the bore 5a, the push rods 20 act against the support 15 in opposition to the compression springs 18.

Arranged within the central bore 5a is an adjusting bar 21 which is provided with two identical axially spaced conical surfaces 21a which cooperate with the inner axial ends of the push rods 20 so that a displacement of the adjusting bar 21 in axial direction causes a parallel shift of the push rods 20 and a displacement of the sealing strips 16 in radial direction. In this manner, the sealing strips 16 are urged by a certain pressing force toward the inner surface of the housing 1, and the unavoidable wear of the sealing strips 16 can be compensated through appropriate readjustment. Since the readjustment of the sealing strips 16 is limited by the compression springs 18, the cross section of the outlet port 4 can extend over the entire width of the interior of the housing 1 so that each compartment 13 can be completely emptied.

Referring now again to FIG. 1, there is shown an force-applying unit acting on the adjusting bar 21 to subject the latter to an axial force which remains constant independent of the position of the adjusting bar 21 and thus independent of the wear of the sealing strips 16.

The force-applying unit of FIG. 1 includes a lever assembly 31 pivoted at 30 to a stationary link 29 which is part of a frame generally designated by reference numeral 40 and suitably attached to the side cover 1b. The lever assembly 31 comprises a long lever arm 31a and a short lever arm 31b extending at an angle of about 90° relative to each other. The long lever arm 31a supports a weight member 32 which is slidable along the lever arm 31a for setting a suitable holding force acting upon the adjusting bar 21. With its end remote to the pivot 30, the short lever arm 31b is articulated to one end of an intermediate link 33, the other end of which being hinged to a push bar 34 which projects into the hollow shaft 5. The push bar 34 is suitably supported within the hollow shaft 5 by a thrust bearing 35 and is operatively connected with the adjusting bar 21 at the facing end thereof.

The magnitude of the holding force acting upon the adjusting bar 21 can easily be set by respectively modifying the distance of the weight member 32 from the pivot 30. By suitably selecting the lever arm lengths, the angular position of the lever arm 31a is only slightly changed during the gradual wear of the sealing strips 16 so that the generated holding force can be considered essentially constant with sufficient accuracy.

Figure 5:
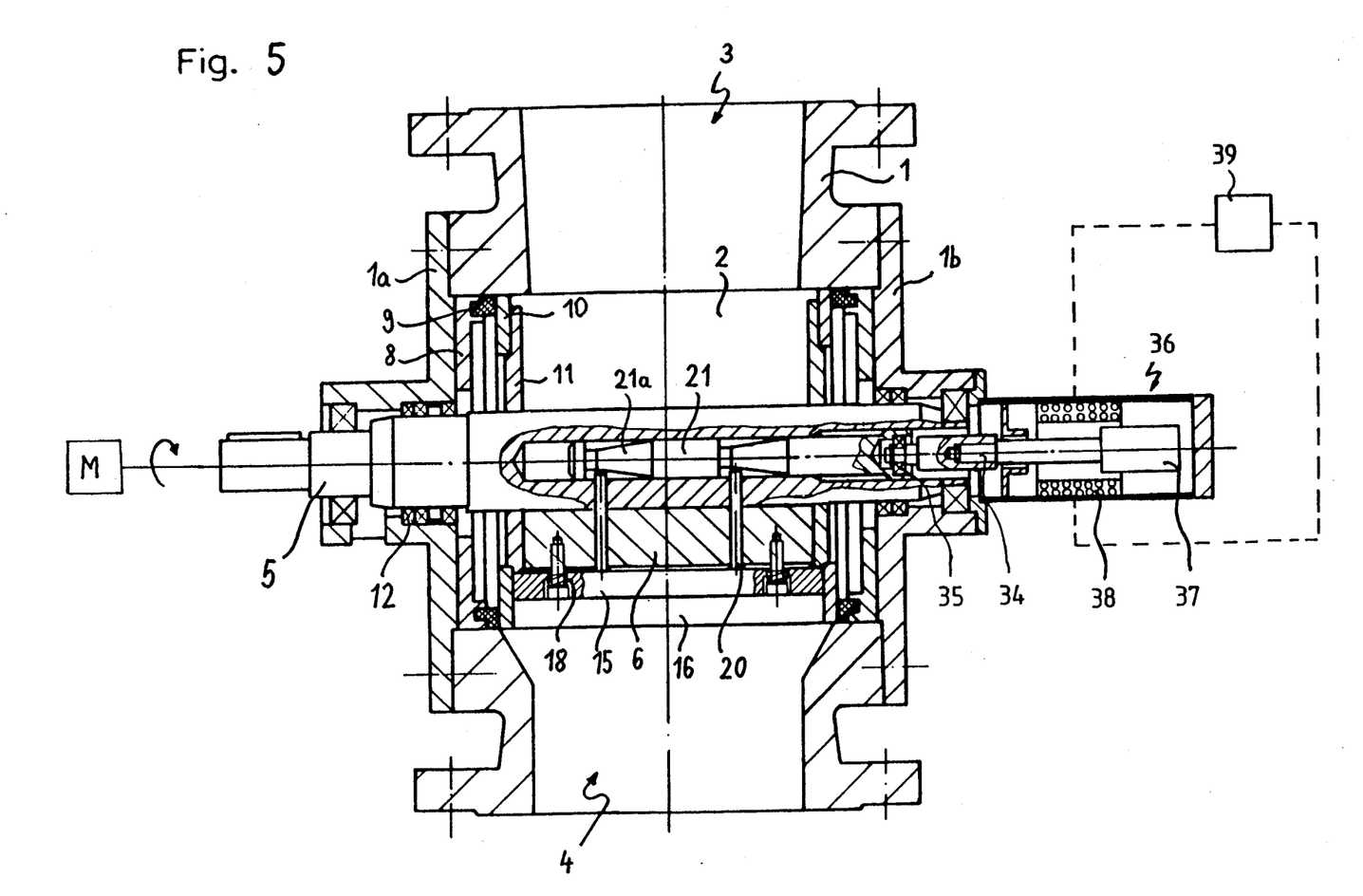
FIG. 5 is a longitudinal section of a second embodiment of a rotary feeder for bulk material in accordance with the invention.

Turning now to FIG. 5, there is shown a longitudinal section of a second embodiment of a rotary feeder which differs from the embodiment of FIG. 1 only in the structure of the force-applying unit. For ease of illustration and understanding, same reference numerals are used for identical parts. The force-applying unit in FIG. 5 comprises a solenoid 36 with a coil 38 approximately cylindrical in form and an armature 37 which reciprocates within and along the axis of the coil 38 and acts upon the push bar 34. The coil 38 is energized by a current source 39 so as to provide the suitable holding force by which the adjusting bar 21 is acted upon by the armature 37.

Figure 6:
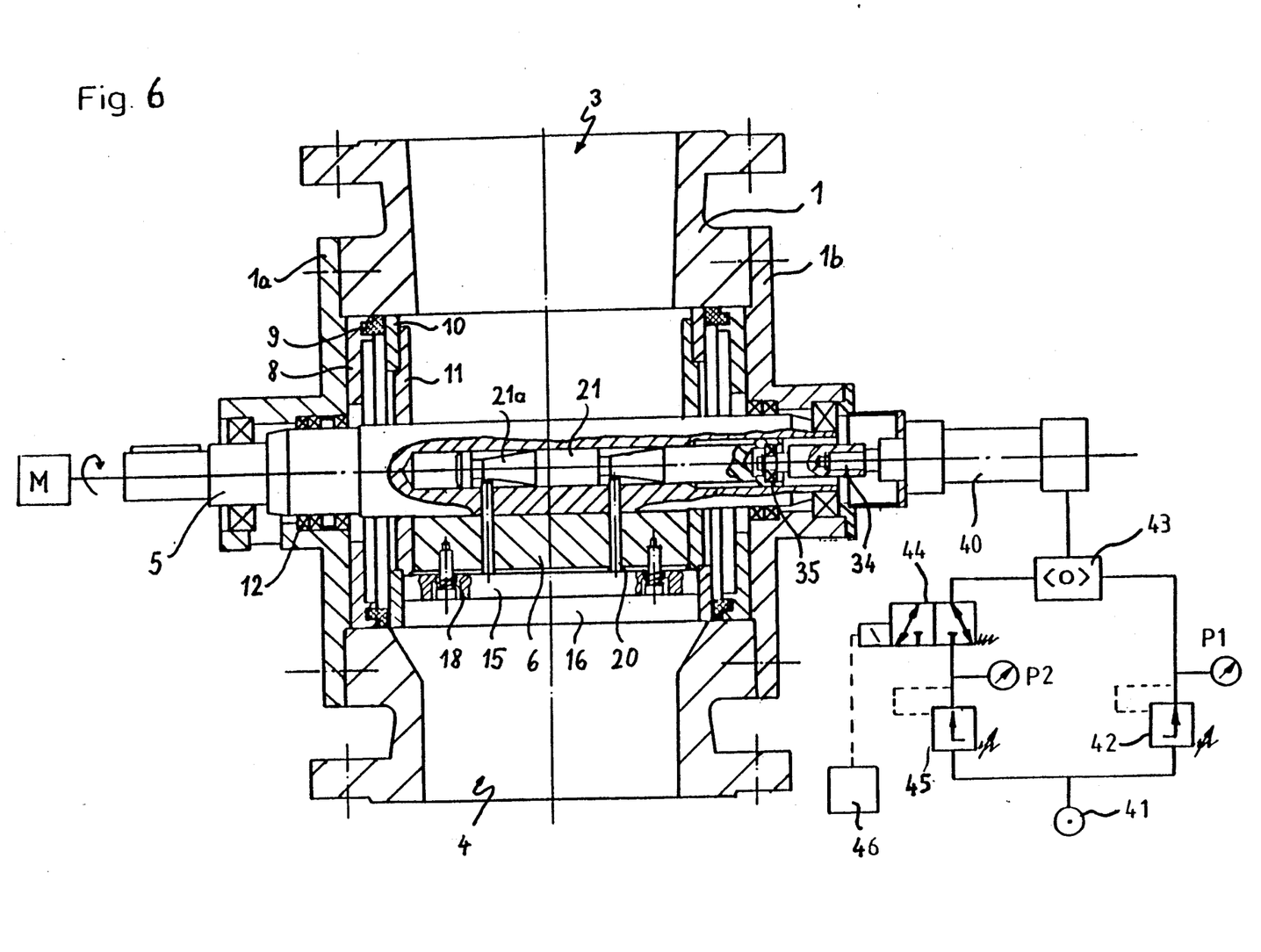
FIG. 6 is a longitudinal section of a third embodiment of a rotary feeder for bulk material in accordance with the invention.

FIG. 6 shows a longitudinal section of a third embodiment of a rotary feeder which is provided with still another example of a force-applying unit. Accordingly, the force-applying unit includes a piston/cylinder arrangement with working cylinder 40 and a piston which is connected to the push bar 34. In the nonlimiting example of FIG. 6, the piston/cylinder arrangement includes a single-acting working cylinder in which the piston is returned for example by means of a spring (not shown). It will be appreciated that a double-acting working cylinder may certainly be used as well.

Operatively connected with the working cylinder 40 is the output of a pneumatically controlled OR-gate 43, with one input being coupled to a pressure source 41 via a pressure reducing valve 42 which is set to a so-called holding pressure level P1 that is the pressure by which the working cylinder 40 acts upon the adjusting bar 21 with the holding force. The other input of the OR-gate 43 is connected via a solenoid valve 44 with a second pressure regulator 45 which is set to a higher pressure level P2. The solenoid 44 is momentarily energized at time intervals by a current impulse from an electric control 46.

Thus, the working cylinder 40 is initially supplied with the pressure fluid at the pressure P1 by which the adjusting bar 21 is axially loaded. When a readjustment of the adjusting bar 21 is necessary, the solenoid 44 is energized and the OR-gate 42 switches over so that pressure fluid is supplied to the working cylinder 40 at the pressure P2 which is higher than P1 and represents the displacement force by which the adjusting bar 21 is shifted. The displacement force is sufficiently high to overcome all frictional forces which may occur during the transmission of forces up to the sealing strips 16. After displacement of the adjusting bar 21 and switching over of the OR-gate 43 so that pressure fluid is admitted to the working cylinder 40 at a pressure P1, the sealing strips 16 are again urged against the inner wall surface of the housing 1 by the predetermined optimum contact pressure.

By dividing the readjustment into a constant holding force and a periodic, momentary displacement force, the service life of the sealing strips 16 is considerably longer as the holding force can be selected at an optimum level desired for urging the sealing strips 16 against the inner wall surface of the housing 1. On the other hand, the displacement force allows a uniform wear of the sealing strips 16 thus preventing a misalignment of the latter from their parallel position relative to the hollow shaft 5 due to the uneven distribution of the frictional forces so that a unilateral wear of the sealing strips 16 is avoided.

It will be readily recognized that the embodiment of the rotary feeder as shown in FIG. 2 may certainly be modified to encompass the principle of dividing the readjustment into a holding force and into an displacement force. For example, the coil 38 may be energized momentarily at preferably periodic intervals by applying to a higher voltage.

Although not shown in detail, it is certainly possible to provide the holding force by means of a pressure spring while the displacement force is generated by a working cylinder. Suitably, the holding force as exerted by the spring is set to an initially higher value in order to maintain sufficient sealing because the holding force is decreasing with increasing readjustment and increasing wear of the sealing strips.

While the invention has been illustrated and described as embodied in an Apparatus for Feeding Bulk Material, it is not intended to be limited to the details shown since various modifications and structural changes may be made without departing in any way from the spirit of the present invention.

What is claimed as new and desired to be protected by Letters Patent is set forth in the appended claims:

We claim:

1. Apparatus for feeding bulk material; comprising:
   a housing provided with inlet means and outlet means;
   a rotor accommodated within said housing and having a shaft and a plurality of radially extending vanes supported on said shaft to define compartments for transporting the bulk material from said inlet means to said outlet means;
   sealing means provided in said vanes for sealing said vanes against said housing;
   adjusting means acting upon said sealing means for pressing said sealing means in radial direction against said housing, said adjusting means being axially shiftable within said shaft and including an adjusting bar with at least two conical surfaces spaced from each other in axial direction, and push rods provided in said vanes and cooperating with said conical surfaces such that one end thereof abuts said conical surfaces and the other end thereof is connected in force-locking manner with said sealing means; and
   force-applying means acting directly on said adjusting bar for continuously maintaining a sufficient non-resilient contact pressure of said sealing means against said housing, said force-applying means including a lever assembly arranged outside of said housing and having one free end loaded by a weight and another end hinged to said adjusting bar via suitable intermediate links.

2. Apparatus for feeding bulk material; comprising:
   a housing provided with inlet means and outlet means;
   a rotor accommodated within said housing and having a shaft and a plurality of radially extending vanes supported on said shaft to define compartments for transporting the bulk material from said inlet means to said outlet means;
   sealing means provided in said vanes for sealing said vanes against said housing;

adjusting means acting upon said sealing means for pressing said sealing means in radial direction against said housing, said adjusting means being axially shiftable within said shaft and including an adjusting bar with at least two conical surfaces spaced from each other in axial direction, and push rods provided in said vanes and cooperating with said conical surfaces such that one end thereof abuts said conical surfaces and the other end thereof is connected in force-locking manner with said sealing means; and force-applying means acting directly on said adjusting bar for continuously maintaining a sufficient non-resilient contact pressure of said sealing means against said housing, said force-applying means including an electric solenoid having an armature operatively connected to said adjusting bar.

3. Apparatus for feeding bulk material, comprising:

a housing provided with inlet means and outlet means;

a rotor accommodated within said housing and having a shaft and a plurality of radially extending vanes supported on said shaft to define compartments for transporting the bulk material from said inlet means to said outlet means;

sealing means provided in said vanes for sealing said vanes against said housing;

adjusting means acting upon said sealing means for pressing said sealing means in radial direction against said housing, said adjusting means being axially shiftable within said shaft and including an adjusting bar with at least two conical surfaces spaced from each other in axial direction, and push rods provided in said vanes and cooperating with said conical surfaces such that one end thereof abuts said conical surfaces and the other end thereof is connected in force-locking manner with said sealing means; and force-applying means acting directly on said adjusting bar in force-locking manner for continuously maintaining a sufficient non-resilient contact pressure of said sealing means against said housing, said force-applying means including a piston/cylinder unit with a piston acting on said adjusting bar and a working cylinder actuated by a pressure fluid supplied by a pressure source.

4. Apparatus as defined in claim 3 wherein said force-applying means further includes a pneumatically controlled OR-gate having an output connected to said working cylinder and two inputs, a first pressure regulator operatively connected to one of said inputs of said OR-gate and providing a holding pressure corresponding to said constant holding force, and a solenoid valve operatively connected to said other input of said OR-gate and providing momentarily a displacement pressure corresponding to said displacement force.

5. Apparatus for feeding bulk material; comprising:

a housing provided with inlet means and outlet means;

a rotor accommodated within said housing and having a shaft and a plurality of radially extending vanes supported on said shaft to define compartments for transporting the bulk material from said inlet means to said outlet means;

sealing means provided in said vanes for sealing said vanes against said housing;

adjusting means acting upon said sealing means for pressing said sealing means in radial direction against said housing, said adjusting means being axially shiftable within said shaft; and springless force-applying means acting directly on said adjusting means for continuously subjecting said adjusting means to a constant non-resilient axial holding force which is independent of the axial displacement of said adjusting means so as to continuously maintain a sufficient contact pressure of said sealing means against said housing.

6. Apparatus as defined in claim 5 wherein said force-applying means includes an electric solenoid having an armature operatively connectd to said adjusting means.

7. Apparatus as defined in claim 5 wherein said force-applying means includes a piston/cylinder unit with a piston acting upon said adjusting means and a working cylinder actuated by a pressure fluid supplied by a pressure source.

8. Apparatus as defined in claim 5 wherein said force-applying means includes a lever assembly arranged outside of said housing, said lever unit having one free end loaded by a weight member and another end hingedly connected to said adjusting means via suitable intermediate links.

9. Apparatus as defined in claim 8 wherein said lever assembly includes a long lever arm, said weight member being supported by and movable along said long lever arm to allow setting of said constant holding force, and a short lever arm pivoted to said long lever arm and being hingedly connected to said adjusting means via said intermediate links.

10. Apparatus as defined in claim 5 wherein said force-applying means is adapted to exert at time intervals a momentary displacement force which is considerably higher than said constant holding force which corresponds to said contact pressure by which said sealing means is urged against said housing.

11. Apparatus as defined in claim 10 wherein said force-applying means further includes a pneumatically controlled OR-gate having an output connected to said working cylinder and two inputs, a first pressure regulator operatively connected to one of said inputs of said OR-gate and providing a holding pressure corresponding to said constant holding force, and a solenoid valve operatively connected to said other input of said OR-gate and providing momentarily a displacement pressure corresponding to said displacement force.

* * * * *